Aug. 12, 1969   B. MOKRYTZKI   3,461,373
PULSE WIDTH MODULATED INVERTER
Filed March 20, 1967   3 Sheets-Sheet 1

INVENTOR.
BORIS MOKRYTZKI
BY Woodling, Krost,
Granger and Rust
ATTORNEYS

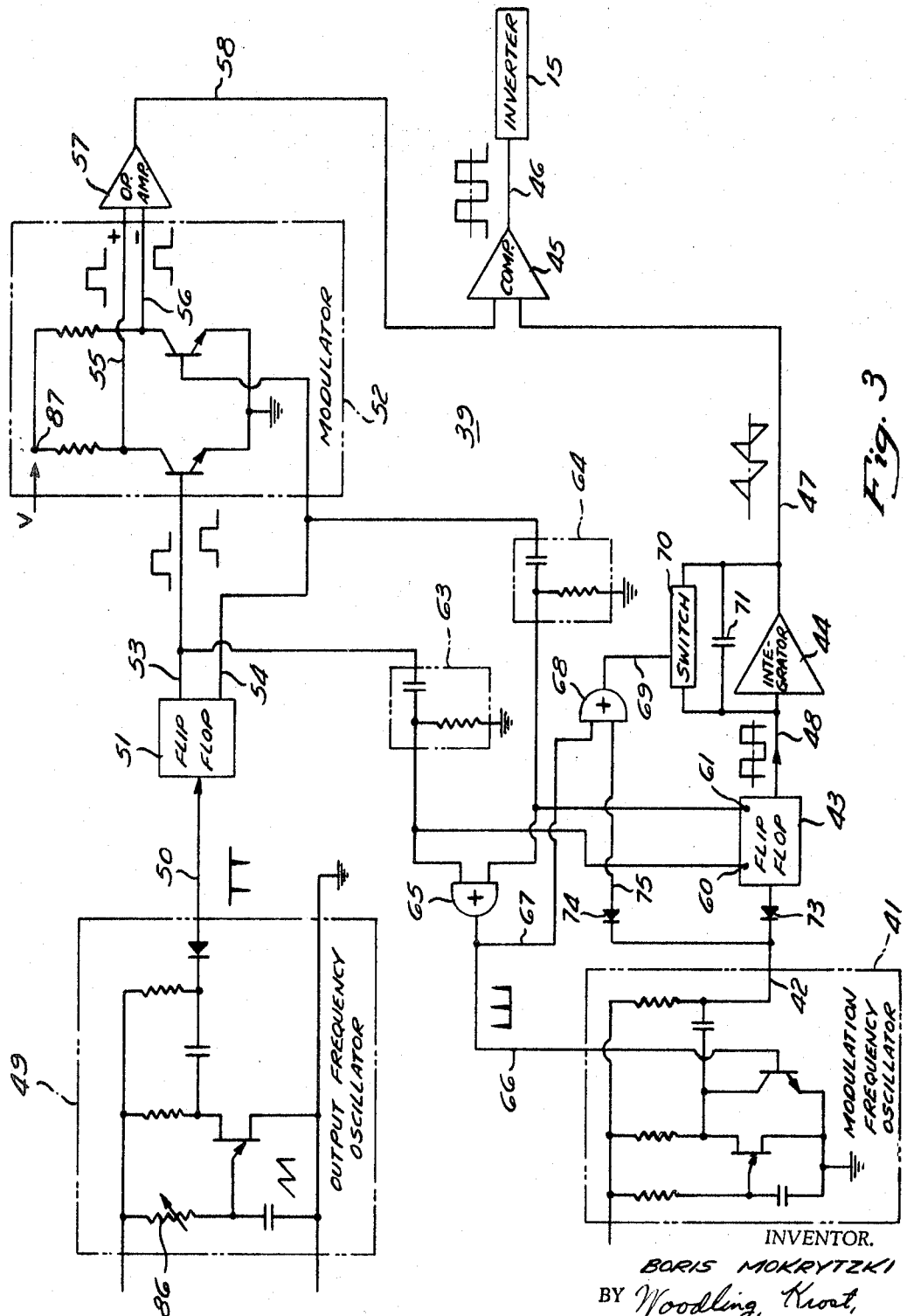

Aug. 12, 1969  B. MOKRYTZKI  3,461,373
PULSE WIDTH MODULATED INVERTER
Filed March 20, 1967  3 Sheets-Sheet 3
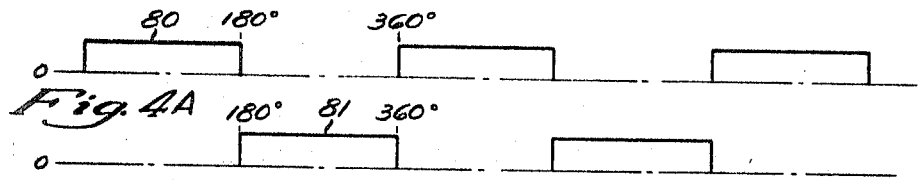
Fig. 4A
Fig. 4B
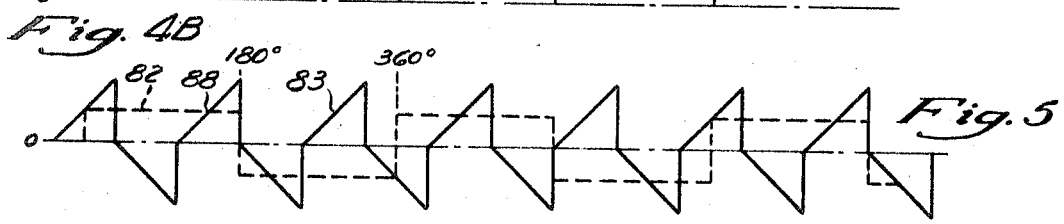
Fig. 5
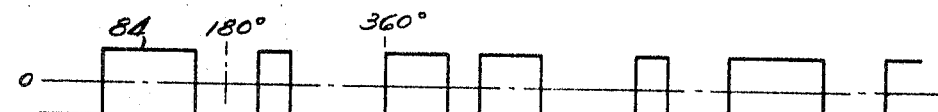
Fig. 6
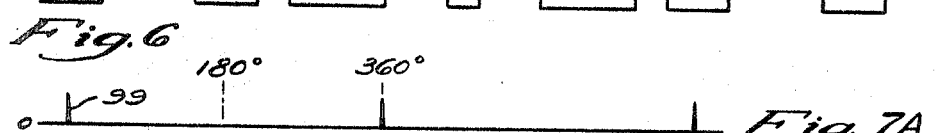
Fig. 7A
Fig. 7B
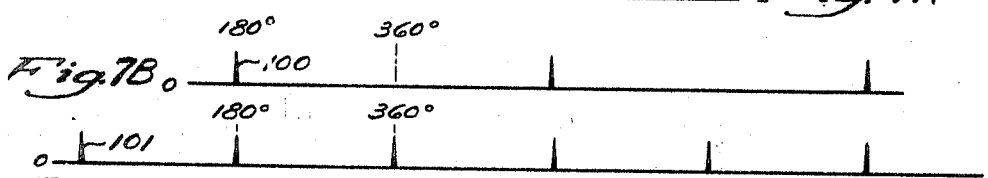
Fig. 8
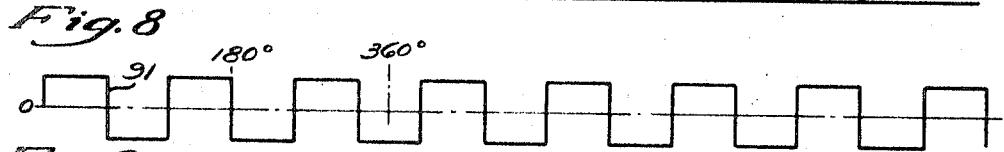
Fig. 9
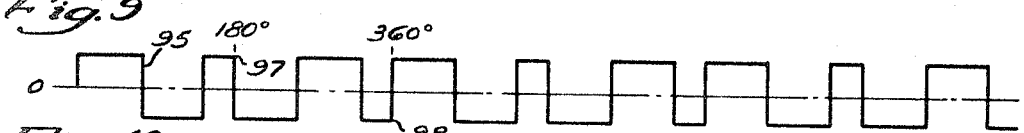
Fig. 10
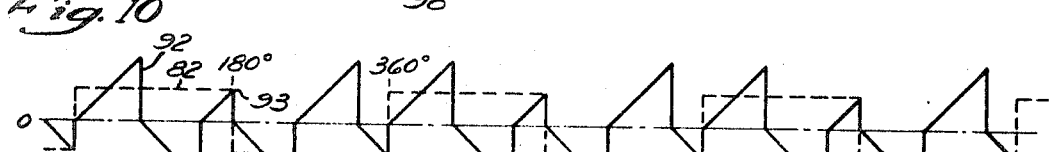
Fig. 11
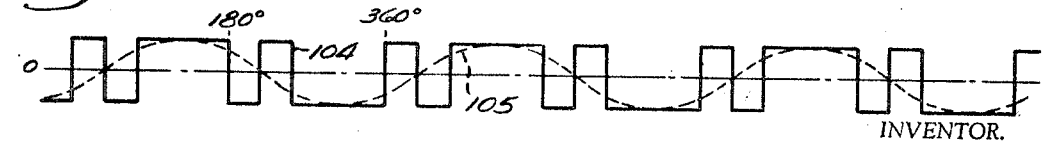
Fig. 12
INVENTOR.
BORIS MOKRYTZKI
BY Woodling, Krost,
Granger and Rust
ATTORNEYS United States Patent Office 3,461,373
Patented Aug. 12, 1969

3,461,373
PULSE WIDTH MODULATED INVERTER
Boris Mokrytzki, Kirtland, Ohio, assignor to Reliance Electric and Engineering Company, a corporation of Ohio
Filed Mar. 20, 1967, Ser. No. 624,539
Int. Cl. H02m 1/12
U.S. Cl. 321—9        9 Claims

ABSTRACT OF THE DISCLOSURE

The invention discloses a pulse width modulated inverter which has a source defining the fundamental frequency of inverter output and a source defining a modulation frequency. The modulation frequency may be any random frequency, and when it is not an integral multiple of the fundamental frequency, DC components and even harmonics are induced in the inverter output. These harmful effects are eliminated by synchronizing the modulation frequency with the fundamental frequency at periodic intervals, preferably $1/2nF$, wherein $n$ is the number of phases and $F$ is the fundamental frequency.

Cross reference

This invention may be practiced on many forms of inverters, including that shown in my copending application filed concurrently herewith, entitled "Pulse Width Modulated Inverter With Stepped Wave Envelope," and that shown in the copending application Ser. No. 577,325 entitled "Clamp Circuit for Communication Capacitors," filed Sept. 6, 1966, by Boris Mokrytzki et al.

Background of the invention

In order to control the voltage output of an inverter as needed, one method is to use a variable direct voltage source. This requires a control system on such direct voltage source. The present invention is concerned with a pulse width modulated inverter in which a particular fixed or controllable fundamental frequency is chosen to be the inverter output frequency and in which the input voltage may be fixed. This fundamental frequency is modulated preferably at a higher frequency to establish pulses of output voltage and the proportion of on time to off time will establish the average voltage output of the inverter. If the modulation frequency is an *even* multiple of the fundamental frequency, the positive half cycle wave shape is identical to the negative half cycle wave shape and all even harmonics are cancelled out. If modulation frequency is an odd multiple of fundamental freqency, even harmonics are produced in the output voltage wave and for the case of a fixed modulation frequency and a variable fundamental frequency, various amplitudes of odd and even harmonics are produced as the operating ratios vary. However, inverters are used primarily because it is possible to change the output fundamental frequency and thus theoretically should be usable to energize AC motors for variable speed. If an even multiple of fundamental and modulating frequency were to be used, then as the fundamental frequency was varied to get variable speed of the motor load, it would be necessary to proportionally vary the modulation frequency. This in many cases is not desirable because with wide frequency range of motor loads the actual frequencies of the harmonics with low fundamental frequency will cause large harmonic currents to flow and will often even cause negative torque in a motor subtracting from the positive torque. For high speed motor operation if the frequency ratio has been made large enough to get good low speed performance without excessive harmonic current flow, then one gets excessive inverter commutation.

It is undesirable to have a step change of modulating frequency as we go from high to low fundamental frequency because it is undesirable to disturb most systems in the breadth of their speed range.

Accordingly an object of the invention is to provide a pulse width modulated inverter which obviates the above-mentioned disadvantages.

Another object of the invention is to provide a pulse width modulated inverter wherein the modulation frequency is synchronized periodically with the fundamental output frequency.

Another object of the invention is to provide a pulse width modulated inverter wherein a signal proportional to the fundamental output frequency is used to synchronize the modulation frequency at periodic intervals which periodic intervals bear a definite relationship with the period of the fundamental frequency.

Another object of the invention is to provide an inverter wherein DC components and even harmonics are eliminated or minimized in the inverter output.

Other objects and a fuller understanding of the invention may be had by referring to the following description and claims, taken in conjunction with the accompanying drawings, in which:

FIGURE 3 is a diagram of the control circuit for the inverter; and

FIGURES 4 to 12 are wave form diagrams illustrating the operation of the inverter.

Figure 1:
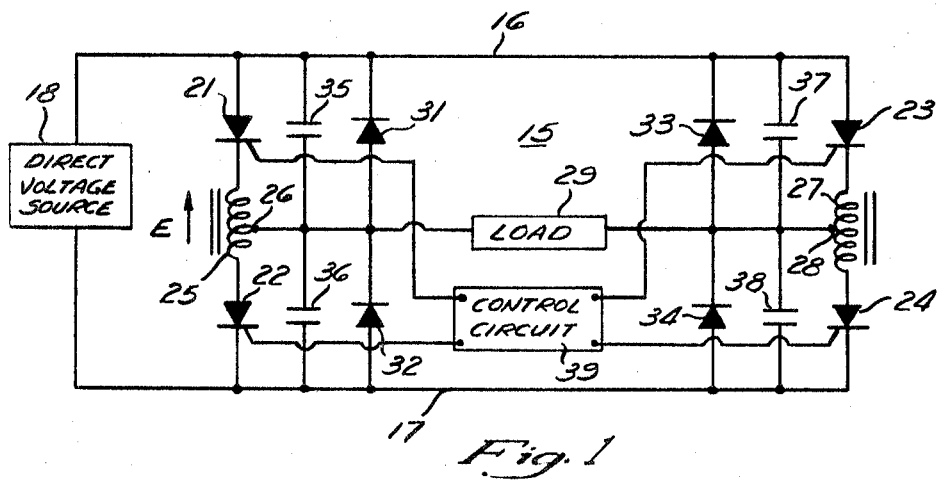
FIGURE 1 is a schematic diagram of a typical inverter circuit which may be controlled in accordance with the invention.

FIGURE 1 shows an inverter circuit 15 which may be utilized in practicing the invention, and this circuit may be similar to that shown in the General Electric Controlled Rectifier Manual, 1960, page 143. This inverter 15 has a positive bus 16 and a negative bus 17 supplied from a DC source 18. The inverter 15 includes generally first, second, third and fourth unidirectionally controlled devices shown as thyristors 21–24, respectively. The invention may be practiced with many forms of controlled devices and the thyristors 21–24 are merely illustrative of one of these many forms. The thyristors 21 and 23 are connected in series by a reactor 25 having a mid-tap 26. The thyristors 23 and 24 are connected in series by a reactor 27 having a mid-tap 28.

Each series pair of thyristors is connected between the positive and negative bus for current conduction toward the negative bus 17. The mid-taps 26 and 28 are the load terminals of an AC load 29 designed to be energized with a variable frequency alternating voltage from the inverter circuit 15. Diodes 31 to 34 are connected effectively in parallel with the thyristors 21–24 for conduction in the opposite direction. Commutating capacitors 35–38 are connected in parallel with each of the diodes 31–34, respectively.

The inverter circuit 15 of FIGURE 1 is illustrated as a single phase circuit although it may be expanded to a three phase circuit by adding another pair of thyristors and having the three common points or mid-taps of the reactors supply three load terminals of a three-phase load.

Figure 2:
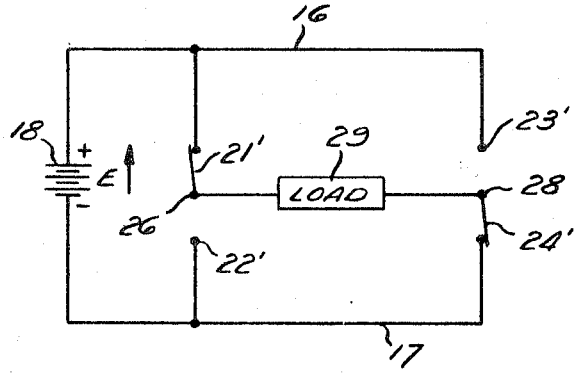
FIGURE 2 is a switch analog of the inverter of FIGURE 1.

FIGURE 2 illustrates a switch analog of the inverter circuit 15. In this switch analog 15′, the thyristors 21–24, and the associated diodes 31–34 may be considered as four different switches. It will be noted that a conducting thyristor and its associated diode represent a closed switch whereas this switch may be opened by non-conduction of both the thyristor and the associated diode. Accordingly, in FIGURE 2 the switches 21′ and 24′ have been labelled to generally correspond to the thyristors 21–24 of FIG- URE 1. The load in FIGURE 2 will have three different states of load voltage. The first state is as illustrated in FIGURE 2 when switch 21' and switch 24' are closed. The load voltage is positive on terminal 26 at this instant. A second state is with switches 21' and 24' open and switches 22' and 23' closed. The load voltage will then be positive on terminal 28. The third state of load voltage is when either switches 21' and 23' are closed or 22' and 24' are closed. In such case the load voltage will be zero.

The inverter circuit 15 of FIGURES 1 and 2 also includes a control circuit 39 for controlling the conduction of the controlled devices or thyristors 21–24.

FIGURE 3 illustrates a preferred embodiment of a control circuit 39 which may be used to control the inverter 15. The control circuit 39 includes a modulation frequency source 41 supplying a modulation frequency on a channel 42 and through wave shaping means including a flip-flop circuit 43 and an integrator 44 to a comparator 45. The comparator supplies an output on the channel 46 to the inverter 15. An output frequency source 49 supplies a signal on a channel 50 to a counter 51 which is a simple inverter and may be a flip-flop and then supplies a signal to a modulator 52, in this case on two channels 53 and 54. The modulator 52 has an output on channels 55 and 56 to an operational amplifier 57. This operational amplifier has an output on channel 58 to the comparator 45, and this together with the input on channel 47 from integrator 44 means that two signals are applied to the comparator 45.

The counter 51 has means to synchronize and initialize the operation of the control circuit 39. It does this by outputs from the channels 53 and 54 to synchronize the modulation frequency source 41 and to synchronize the integrator 44. Also it initializes the wave shaping device 43 which has been illustrated as a flip-flop. Channels 53 and 54 are fed to a set input 60 and a reset input 61, respectively, on the flip-flop 43. Also these channels 53 and 54 are supplied through a differentiator network 63 and 64, respectively, to an OR gate 65. The output from the OR gate supplies the synchronizing signal to the modulation frequency source 41 on a channel 66 and also on a channel 67 supplies a synchronizing signal to another OR gate 68. This OR gate has an output channel 69 to control the synchronizing of the integrator 44. It accomplishes this by having the output channel 69 control a switch 70 which is shunted across a capacitor 71 in turn connected across the integrator 44. The integrator 44 may be an operational amplifier and when the capacitor 71 is connected in parallel therewith, this makes the operational amplifier act as an integrator.

The modulation frequency oscillator 41 may have an output as indicated on FIGURE 3 with merely sharp pulses at a predetermined frequency. This may be a free running oscillator if desired for simplicity and economy. A diode 73 in the output channel 42 is polarized to conduct *negative* going pulses to the flip-flop 43. Also another diode 74 in a channel 75 supplies *negative* going pulses to an input of the OR gate 68.

Operation

The inverter 15 is desired to be operated at a predetermined and variable frequency. A typical load for the inverter 15 might be an AC motor, for example, an induction or synchronous motor, and it is desired to operate this motor through a variable speed range of, for example, a 10:1 speed range corresponding to 60 to 6 Hz. of output fundamental frequency. Also in practical inverter circuits, it is desirable to be able to change the average output voltage in order to change the power output of the inverter 15 to the motor load. One way to vary the average voltage output is to use pulse width with modulation wherein some modulation frequency is superposed on the fundamental frequency. In practical situations, this modulation frequency is higher than the fundamental frequency. The control circuit 39 has means to first establish the fundamental frequency for proper motor speed. Secondly, this control circuit 39 has a means to supply a modulation frequency superposed on the fundamental frequency. In pulse width modulation the width of the pulses is varied. In other words, the proportion of on time to off time is high, then the average output voltage will be high and close to the maximum voltage output governed by the direct voltage source 18. Conversely if the proportion of on time to off time of the controlled devices 21–24 is lower, then the average output voltage will be low.

The modulation frequency is derived from a source 41 shown in FIGURE 3. This may be an oscillator, and one of many types which may be used is illustrated in FIGURE 3. If too high a modulation frequency is chosen, then this increases the losses in the inverter because each time a thyristor is switched, there are losses in connection with the communication. This heats the thyristors and accordingly limits the rating thereof. This means that there is less power output from the inverter 15 for a given size of thyristor. If one uses outsized thyristors to compensate, then this does not make an inverter which is competitive from the economic standpoint. Accordingly one should choose as low a modulation frequency as possible in order to limit the losses in the inverter.

To simplify the circuit, one may choose a modulation frequency which does not change with nor is it an integral multiple of the fundamental output frequency of the inverter. Also for simplicity and economy, one may choose a free-running oscillator rather than one such as a crystal controlled oscillator at a precisely determined frequency. A practical value for such modulation frequency might be 360 Hz. for either single phase or three phase output of the inverter 15. However when one attempts to use a relatively low modulation frequency and to make it not an integral multiple of the fundamental frequency, then one discovers the new problem that the output frequency of the inverter will have even harmonics as well as a DC component for some half cycles, and also a third harmonics may be present in three phase inverter outputs. FIGURES 4A and 4B show voltage waves 80 and 81, respectively, which are firing patterns for the thyristors 21–24 to establish the fundamental frequency. This might be anything from 6 to 60 Hz. for example, depending upon the desired speed of the motor load of the inverter 15. FIGURE 5 illustrates a combined voltage wave 82 which is the desired firing pattern of the fundamental frequency of the output, and this may appear on channel 58, for example. Also shown in FIGURE 5 is a voltage wave 83 which may be representative of the shaped wave form on channel 47 from the modulation frequency source 41 as a free-running source which is unsynchronized relative to the fundamental frequency 82.

FIGURE 6 illustrates a complete voltage wave 84 which is representative of the output from the inverter 15 caused by the modulation frequency 83 interacting with the fundamental frequency wave 82, and this voltage wave 84 may be considered the output voltage of the inverter 15. Comparing voltage waves 84 and 82, it will be noted that the output voltage wave 84 is not symmetrical and merely by inspection, one will observe that the first half cycle does not have the same average voltage as the second half cycle. Accordingly, there will be a negative DC component for this cycle. A Fourier harmonic analysis of this wave form 84 of FIGURE 6 will disclose the presence of even harmonics as well as the DC component previously mentioned for some of the half cycles. Such harmonic effects are often undesirable if not intolerable for example, in AC motor drives where these hormonics can induce excessive currents or reverse torques. If the AC motor is driving a sensitive load, for example, one of several motors in a paper processing line, then the sudden reverse torque intermittently applied to the motor could tear the paper or otherwise completely disrupt the processing line.

The invention provides a circuit to eliminate the DC component and the even harmonics which otherwise would present, and also the third harmonic component and their multiples on three phase inverters, as shown in FIGURE 6. The invented circuit accomplishes this by synchronizing the modulation frequency $f$ at periodic intervals of the fundamental frequency F set by the output frequency source 49. This source 49 has a manually variable control 86 shown as a rheostat to illustrate one form of adjusting the frequency of this output frequency oscillator 49. This may be an open loop system or may be a closed loop system having some intelligence feedback from the inverter output to control the desired fundamental frequency. This output frequency oscillator 49 may be a sawtoothed wave generator or relaxation oscillator, for example, as examples of an operable oscillator.

This output frequency on channel 50 must be at least 2F. The counter 51 counts down from the frequency of the oscillator 49. This permits use, if desired, of a source 49 frequency at a higher value than that desired for the fundamental frequency F. As one example of a counter 51, the circuit 39 shows a flip-flop circuit which merely counts down in a ratio of 2:1. In a three-phase circuit, for example, one might use a ring counter and count down in a ratio of 6:1. Let us assume that one wants an output fundamental frequency F of 51 Hz. With the flip-flop type of count down counter having a ratio of 2:1, then the output frequency oscillator 49 would be set by the rheostat 86 to have a frequency of 102 Hz. The flip-flop 51 has the two output channels 53 and 54 on which appear gating signals for firing the inverter 15, and these signals may be a square wave, for example 180 degrees out of phase with each other as briefly illustrated on FIGURE 3 and as better illustrated in curves 80 and 81 in FIGURE 4. These signals are applied to the modulator 52. In this case, the modulator is a very simple modulator merely providing a single output on channel 58 which provides the firing pattern for the thyristors 21–24. This modulator 52 may be a more complex modulator, for example, one establishing a sinewave output or with a six, twelve or twenty-four step wave envelope. Also the modulator 52 has a voltage input signal at a terminal 87. This may be a manual input command or some logic to vary the average voltage output of the inverter 15. In this pulse width modulation circuit, it will control the proportion of on time to off time of the thyristors 21–24. As shown, this is an open loop circuit but may also be a closed loop circuit having some form of feedback from the inverter output to control the average voltage output. The output of the modulator 52 is actually supplied on two channels 55 and 56 to an operational amplifier 57 which combines the two output channels into the single output channel 58 on which the desired firing pattern 82, FIGURE 5, for the thyristors is contained, at the fundamental frequency F.

The modulation frequency oscillator 41 may have almost any frequency although as stated above, the lower this frequency is, still maintaining it higher than the fundamental frequency F, the lower the losses in the inverter. Accordingly, it has been found that about 360 Hz. is a satisfactory and practical frequency where 60 Hz. is the maximum desired fundamental frequency. FIGURE 3 illustrates one of many typical circuits for generating this frequency as a free-running oscillator at about 360 Hz. The output appears on channel 42 and is then shaped in wave form to appear on the channel 47 as a wave 83, FIGURE 5. This is a form of wave having alternate positive and negative half cycles and this form has been found to be a practical form to be supplied to the comparator 45 in combination with the modulator output on channel 58 to superpose the modulation frequency on the fundamental frequency. If the two are merely superposed without any regard to synchronization as in FIGURE 5, then the unsymmetrical inverter output voltage wave 84 of FIGURE 6 results which has DC components and even harmonics, and also third harmonics on three phase. The wave shaping is accomplished by the flip-flop circuit 43 and the integrator 44. Again the circuits achieving this wave shaping may be any one of several and the flip-flop 43 and integrator 44 are merely representative. Also the shaped wave may take one of several forms and the wave form 83 shown in FIGURE 5 is satisfactory because it is a sawtooth wave which gradually increases in amplitude to control the thyristors 21–24. This control is effected at a point 88, for example, FIGURE 5 which is a cross-over point of the modulating frequency signal and the fundamental frequency signal which signals that the thyristor then conducting will be turned off. In this preferred embodiment when a thyristor, for example thyristor 21 is turned off, then the complementary thyristor 22 of that pair of thyristors is substantially simultaneously turned on. This maintains continuous conduction through the inverter 15 to the load 29.

The output from the flip-flop 43 may be a square wave as illustrated on channel 48 and as illustrated in the voltage wave 91 in FIGURE 9.

The synchronization of the modulation frequency is done periodically by a signal in accordance with or in proportion to the fundamental frequency F. This synchronizing circuit includes the differentiating circuits 63 and 64 deriving the fundamental frequency from channels 53 and 54. This synchronizing circuit also includes the OR gates 65 and 68 to synchronize the integrator 44 and also to synchronize the modulation frequency oscillator 41. Further this synchronizing initializes the phase of the modulation frequency $f$ by resetting the flip-flop 43. This synchronizing is accomplished by the square waves appearing on channels 53 and 54. These are passed through the differentiating networks 63 and 64 to the OR gate 65. Accordingly when there is a vertical portion on the square waves 80 or 81, the differentiating circuits will supply pulses to the OR gate 65. This has the property of passing a signal to the output channels 66 and 67 whenever a signal is received on either input channel, which is the normal function of an OR gate. This output pulse on channel 67 is fed to the OR gate 68. The switch 70 is provided to short circuit and terminate the output from the integrator 44, and this will occur upon a signal on the output channel 69 which will occur whenever a signal is received on either input channel 67 or 75. Normally the integrator 44 produces a saw-toothed wave, alternating positive and negative going, and a signal is received from the modulation frequency oscillator 41 on channel 75 once each half cycle to terminate the output thus resulting in the vertical fly-back portion of the output wave 83, FIGURE 5. When the synchronizing signal is received on channel 67, the OR gate 68 also has an output to close the switch 70 and terminate the integrator output 44. This results in the voltage wave 92 illustrated in FIGURE 11. It will be noted that this voltage wave 92 is an unsymmetrical wave and has an indeterminate number of cycles or half cycles in a half cycle of the firing pattern voltage 82 shown in FIGURE 5 and also superimposed on FIGURE 11 for convenience. The voltage 92 appearing on channel 47 is thus a composite of the modulation frequency $f$ and the fundamental frequency F and one period of this voltage wave 92 is the same as one period of the fundamental frequency F. By a period is meant that portion wherein the absolute value is repeated. In FIGURE 11, the voltage wave 92 is synchronized at points 93 and 94 and it will be noted that this terminates the ramp voltage at that instant and causes fly-back to the zero axis.

The synchronizing signal is also applied by the OR gate on channel 66 to the modulation frequency oscillator 41 because this oscillator 41 needs to be restarted from the zero axis. The synchronized voltage output from the flip-flop 43 is shown as voltage wave 95 in FIGURE 10 with the synchronizing occurring at points 97 and 98, once each half cycle of the fundamental frequency. FIGURE 7A illustrates the synchronizing voltage wave 99 which may be merely a synchronizing pulse appearing on the output from the differentiator 63. FIGURE 7B illustrates the synchronizing voltage wave 100 appearing as the output from the differentiator circuit 64. These two signals are combined in the OR gate 65 and the combined synchronizing signal 101 on the output channels 66 and 67 appears as is shown in FIGURE 8. The voltage wave 99, FIGURE 7A, is applied to the set input 60 of the flip-flop 43 and the voltage wave 100, FIGURE 7B, is applied to the reset input 61 of the flip-flop. This initializes the phase of the modulation frequency $f$.

FIGURE 12 illustrates a voltage wave 104 of the firing pattern appearing on channel 46. This is after the signals from channels 47 and 58 have been combined in the operational amplifier or comparator 45. This firing pattern thus establishes the sequential firing of the thyristors 21–24. A sine-wave 105 has been superimposed on FIGURE 12 to better illustrate that the voltage wave 104 has an envelope at the fundamental frequency F and which envelope approaches the sine-wave 105. It will be noted that the voltage wave 104 is completely symmetrical in the positive and negative half cycles. Accordingly there is no DC component and all the even harmonics have been eliminated.

The synchronizing circuit in this single phase inverter supplies a synchronizing signal every 180 degrees. For an $n$ phase inverter system, the modulation frequency $f$ must be synchronized every $180/n$ degrees of the output frequency $f$ for the optimum condition of cancellation of harmonics. For example, a two phase inverter system requires synchronization every 90 degrees of the output fundamental frequency and a three phase inverter every 60 degrees of the output fundamental frequency. In the case of a three phase inverter, the output envelope does not normally contain triple harmonics. However non-synchronized pulse width modulation, as shown in FIGURE 6, induces the triple harmonics as well as even harmonics and DC components. In a three phase load, the triple harmonics may induce circulating currents. The optimum synchronizing frequency is $2nF$. However, synchronizing is possible at lesser intervals and the period of the fundamental frequency at which synchronizing may be accomplished in accordance with this invention is equal to $2k+1/2nF$, where $k$ is any integer including zero. It has been found that synchronizing at these longer periods, longer than $2nF$, is still satisfactory in greatly reducing the amplitude of the even harmonics.

What is claimed is:

1. A synchronized pulse width modulated inverter with a variable frequency output, comprising, in combination,
    at least one pair of unidirectionally conducting controlled devices,
    a DC source having positive and negative terminals,
    first and second load terminals,
    means connecting said devices for supplying an alternating voltage to said load terminals,
    a control circuit for controlling the conduction of said devices,
    said control circuit establishing a fundamental frequency rate of output voltage applied to said load terminals by controlling periods of the controlled devices,
    means to derive a modulation frequency higher than said fundamental frequency,
    means to modify the output voltage of said inverter by control of the conducting period of said controlled devices at said modulation frequency rate,
    synchronizing means to synchronize the modulation and fundamental frequencies at periodic intervals which are a fraction of one period of the fundamental frequency F equal to $2k+1/2nF$ where $k$ is any integer including zero, and $n$ is the number of phases.

2. An inverter as set forth in claim 1, wherein said synchronizing means also initializes the start of the phase of the modulation frequency with the phase of the fundamental frequency.

3. An inverter as set forth in claim 1, including diode means connected between each load terminal and the source terminals polarized to permit current flow in the direction opposite to that of the respective controlled devices.

4. An inverter as set forth in claim 1, wherein said means to modify the fundamental frequency turns on the complementary conducting device of the pair substantially upon turn off of the scheduled conducting device.

5. An inverter as set forth in claim 1, wherein said synchronizing means obtains a signal keyed to the fundamental frequency of the inverter output and applies same to said control circuit to synchronize the modulation and fundamental frequencies.

6. An inverter as set forth in claim 1, wherein said periodic intervals are a fraction of one period of the fundamental frequency equal to $1/2nF$, where $n$ is the number of phases and F is the fundamental frequency.

7. An inverter as set forth in claim 1, including an output frequency source establishing the desired fundamental frequency of the inverter output,
    a modulation frequency source establishing a modulation frequency, and
    synchronizing means deriving a signal from the fundamental frequency for synchronizing the initiation of the output from the modulation frequency source and initializing the phase of the modulation frequency with the phase of the fundamental frequency.

8. An inverter as set forth in claim 1, including an output frequency source establishing the desired fundamental frequency of the inverter output,
    a modulation frequency oscillator establishing a modulation frequency of a random frequency,
    wave shaping means including a flip-flop circuit and an integrator connected to the output of said modulation frequency oscillator to establish a wave shaped signal of the modulation frequency wave,
    comparator means comparing the output of the integrator and the output of the output frequency source to control the switching pattern of the inverter,
    said synchronizing means deriving a signal from said output frequency source and synchronizing the initiation of the output from the integrator and the initiation of the output from the modulation frequency oscillator, and
    said synchronizing circuit initializing the set and reset periods of the flip-flop circuit.

9. An inverter as set forth in claim 1, including an output frequency oscillator establishing a multiple of the desired fundamental frequency of the inverter output,
    a counter connected to said output frequency oscillator to count down to the desired fundamental frequency,
    a modulator connected to the output of said counter and connected to control the ouput wave shape of the inverter at the fundamental frequency,
    a modulation frequency oscillator establishing a modulation frequency of a random frequency,
    wave shaping means including a flip-flop circuit and an integrator connected to the output of said modulation frequency oscillator to establish a wave shaped signal of the modulation frequency wave,
    comparator means comparing the output of the integrator and the output of the modulator to control the switching pattern of the inverter,
    said synchronizing means deriving a signal from said counter and synchronizing the initiation of the output from the integrator and the initiation of the output from the modulation frequency oscillator with the fundamental frequency, and said synchronizing circuit initializing the set and reset periods of the flip-flop circuit.

References Cited

UNITED STATES PATENTS

| | | | |
|---|---|---|---|
| 3,301,730 | 3/1967 | Ruch | 321—45 XR |
| 3,319,147 | 5/1967 | Mapham | 321—45 XR |
| 3,321,697 | 5/1967 | Etter | 321—45 |
| 3,324,376 | 6/1967 | Hunt | 321—8 XR |
| 3,334,292 | 8/1967 | King et al. | 321—69 XR |
| 3,376,490 | 4/1968 | Osugi | 321—5 |

OTHER REFERENCES

Principles of Inverter Circuits, B. D. Bedford and R. G. Hoft, Pub. by John Wiley & Sons, Inc., New York, pp. 235–241, 254–263, and 310–313, published Dec. 23, 1964.

JOHN F. COUCH, Primary Examiner

W. M. SHOOP, JR., Assistant Examiner

U.S. Cl. X.R.

321—45